Sept. 2, 1969   K. S. SVENDSEN ET AL   3,464,293
STEEL RULE CUTTING DIE AND METHOD OF FABRICATION
Filed Aug. 1, 1967   2 Sheets-Sheet 1
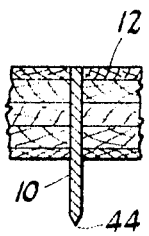
FIG.4
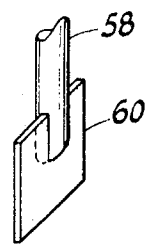
FIG.6
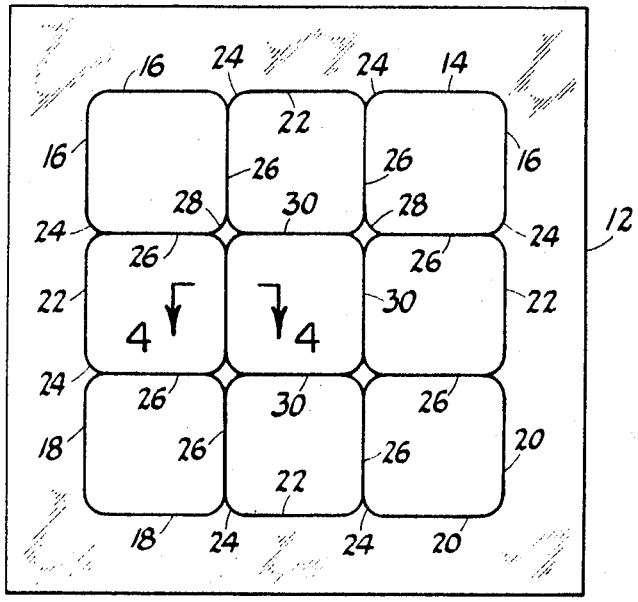
FIG.1
FIG.3
FIG.2
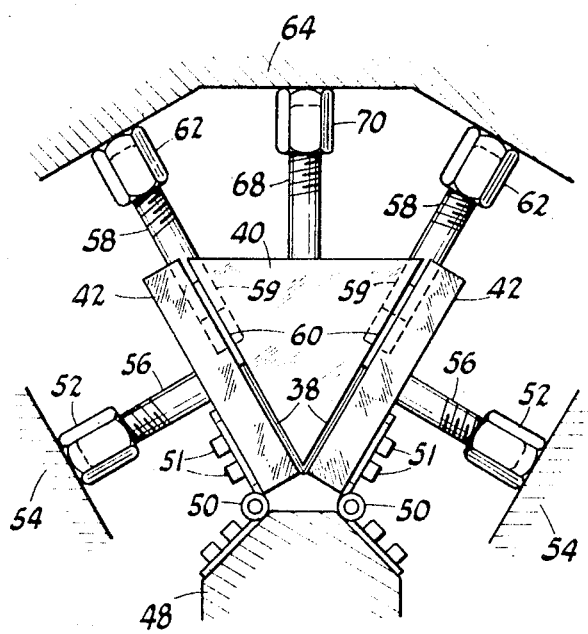
FIG.5
INVENTORS:
KONRAD S. SVENDSEN
WILLIAM J. SCHNORR
BY
Arthur C. Fril
AGENT

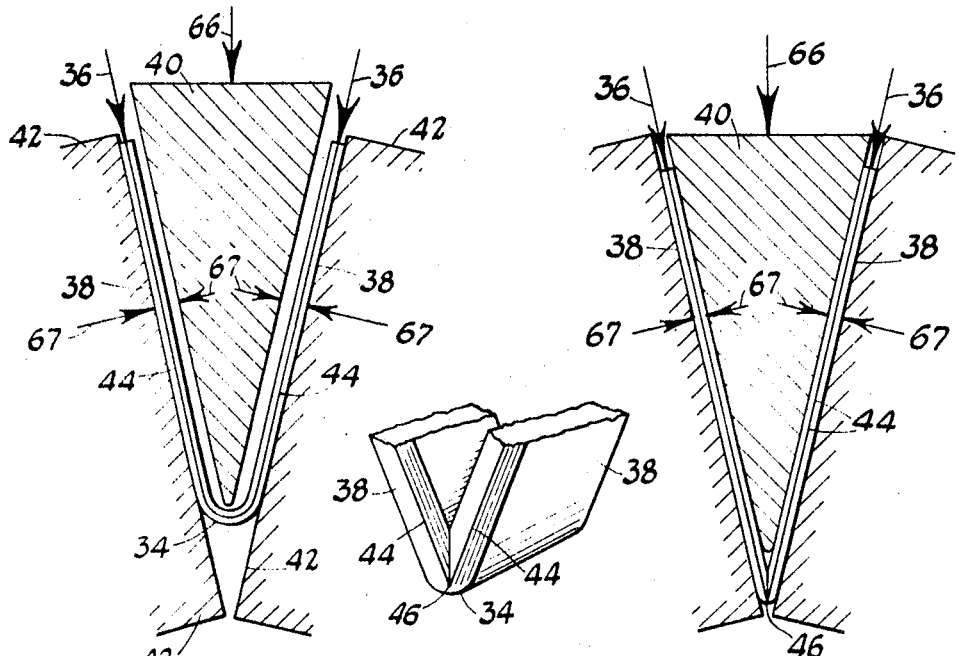
FIG.7　　　FIG.9　　　FIG.8
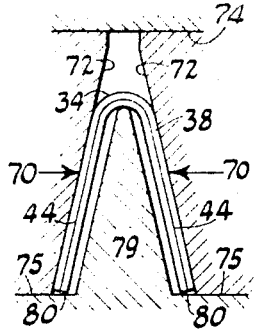 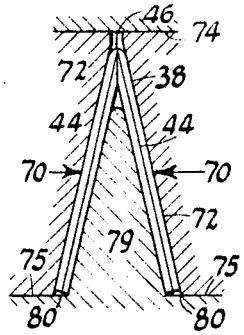 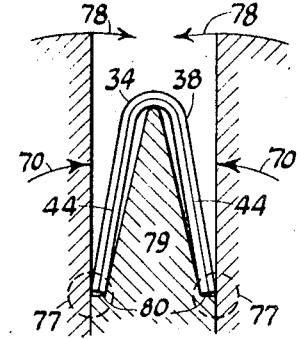 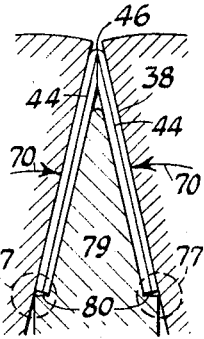
FIG.14 FIG.15 FIG.16 FIG.17　FIG.18　FIG.19　FIG.20 FIG.21
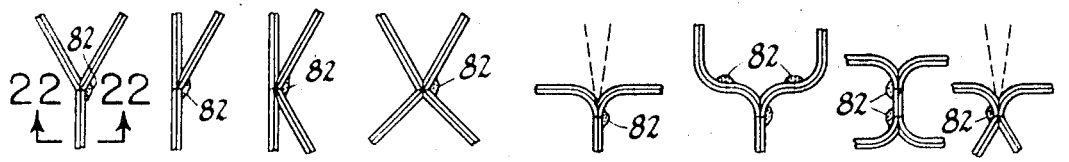
FIG.10　　FIG.11　　FIG.12　　FIG.13
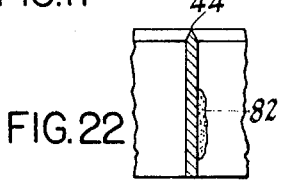
FIG.22
INVENTORS:
KONRAD S. SVENDSEN
WILLIAM J. SCHNORR
BY
AGENT United States Patent Office 3,464,293
Patented Sept. 2, 1969

3,464,293
STEEL RULE CUTTING DIE AND METHOD OF FABRICATION
Konrad S. Svendsen, 100 Wintonbury Ave., Bloomfield, Conn. 06002, and William J. Schnorr, Milwaukee, Wis. (1004 St. Clair St., Manitowoc, Wis. 54220)
Filed Aug. 1, 1967, Ser. No. 657,581
Int. Cl. B21k 5/20; B21d 31/00, 25/00
U.S. Cl. 76—107        7 Claims

ABSTRACT OF THE DISCLOSURE

A cutter and method for producing a sharply defined corner when cutting paper or other material of similar nature, the cutter being made of a strip of steel rule having a cutting edge along its long side and being bent along a line normal to the cutting edge to form an angle, the still rounded tip formed by such bending being deformed in a direction toward the apex of the angle sufficiently to cause the cutting edges of the legs of the angle to meet at a sharp point of intersection.

Background of the invention

The invention relates to steel rule cutting dies as commonly used in the paper cutting industry, and more particularly to a specific method for fabricating a steel rule cutting die and to a cutter produced by that method which is able to cut an angle so that the sides of the angle meet at a sharp intersection point.

The invention however is not limited to paper cutting, but may also be used for the cutting of other similar material such as plastics, cork, leather, light gage metal etc.

Steel rule dies are generally made by jigsawing the desired contour in a die board, usually made of hardwood plywood, but other suitable material can be used. Into the slot formed by the jigsawing is inserted a steel rule having a pre-ground beveled cutting edge. The steel rule is preformed and fitted to the desired contour prior to insertion into the slot in the die board. One of the more commonly used steel rules is 2 point (0.028" thick and .937" high), but other thicknesses and heights are used. Usually the thickness of the die board is approximately ¼" less than the height of the steel rule.

The steel rule is available in straight sections and is formed by the die maker on bending equipment to conform to the jigsawed contour in the die board. Using conventional bending equipment, the minimum radius to which a steel rule can be formed is approximately twice the thickness of the rule.

In many cases this limitation is satisfactory, but contours occur where an absolute sharp point is required. Present art using conventional equipment has several methods available to accomplish this end. Some of these are (1) mitering two pieces of steel rule by grinding, and (2) butting a piece of steel rule with an extended cutting edge against the side of another piece of a steel rule.

Joints made by these processes have serious limitations. Depending on application and material to be cut, these mitres in many cases must be welded or soldered, however are still subject to failure.

A third method to produce a die which cuts a sharp corner is by machine milling and grinding from a solid piece of steel. While dies produced by this method perform satisfactorily they are very costly which limits their use in low cost steel rule dies. A detailed description of a steel rule die making use of a machined corner cutting piece is given in U.S. Patent 3,262,547, issued to A. R. Pfaff, Sr. et al. on Aug. 2, 1966.

Summary of the invention

The invention resides in a steel rule cutting die or cutter having the shape of a V, and having cutting edges provided on the legs of the V which meet at a sharply defined intersection point, the sharp tip of the cutting edges being produced in accordance with the invention by bending a steel rule to form a rounded tip, and then applying suitable pressure to each leg of the bent rule while forcing it into a die to thereby form the rounded tip into a sharp corner at the cutting edge.

It is accordingly a primary object of the invention to produce a bent steel rule cutter having a sharp tip from one piece of steel rule and without joints.

It is another object of the invention to produce a steel rule corner cutter having a considerable increase in structural strength due to one piece construction at the point of highest stress in contrast to a steel rule corner cutter produced with a mitred joint or butted joint.

It is a further object of the invention to produce a steel rule corner cutter which affords a substantial reduction in cost over a steel cutter produced from a solid piece by machine milling and grinding.

Brief description of the drawings

FIGURE 1 is a bottom plan view of an illustrative steel rule cutting die incorporating the herein disclosed basic corner or tip member.

FIGURES 2 and 3 are enlarged views of the two and four corner members of the steel rule cutting die depicted in FIGURE 1.

FIGURE 4 is a cross-section through a portion of the steel rule cutting die as taken along line 4—4 of FIGURE 1.

FIGURE 5 is a diagrammatic representation of an apparatus organized for producing a steel rule corner cutter in accordance with the invention.

FIGURE 6 is a perspective view of a pushing member of the apparatus of FIGURE 5 used for transmitting a longitudinal force upon the legs of the bent steel rule.

FIGURE 7 is an enlarged view in cross-section of a steel rule when bent in a conventional manner and producing a rounded tip, with the bent steel rule placed in a die for further processing in accordance with the invention.

FIGURE 8 is an enlarged view in cross-section of a bent steel rule after its legs have been subjected to longitudinal forces in accordance with the invention to produce a sharp corner at the cutting edge.

FIGURE 9 is a still further enlarged perspective view of the tip of the bent steel rule, showing the location of the intersection point of the cutting edges in relation to the thickness of the steel rule tip.

FIGURES 10 and 11 are views similar to FIGURES 8 and 9, showing another embodiment of the invention with direct lateral forces used to form the sharp intersection point of the cutting edges.

FIGURES 12 and 13 are also views similar to FIGURES 8 and 9, showing still another embodiment using direct lateral forces, to form the sharp intersection point of the cutting edges.

FIGURES 14, 15, 16, 17, 18, 19, 20 and 21 show various configurations, some straight, some curvilinear, of steel rule cutting dies of the many contours which can be formed with the basic V-cutter described herein below, as required in the art.

FIGURE 22 is an elevational section of the steel rule configuration shown in FIGURE 14 when taken on line 22—22 thereof.

Description of the preferred embodiment

Referring now to FIGURE 1, there is shown a plan view of one embodiment of a steel rule cutting die according to the invention. As depicted therein a steel rule cutting die generally designated by numeral 10 is mounted in a slot of suitable shape cut in a hardwood plywood board 12 as shown in FIGURE 4. For purposes of explanation the steel rule cutting die 10 is shown as being formed as a square including squares of steel rule elements for cutting a plurality of substantially square pieces of paper. Four of the cutting rule elements have right angle portions with rounded corner as indicated by numerals 14, 16, 18 and 20. The remainder of the steel rule cutting die 10 includes straight cutting rule elements or sections 22 joined together by a plurality of two-corner members 24 with the rounded right angle portions 14, 16, 18 and 20. Other straight cutting rule elements 26 are joined together by a plurality of four-corner members 28 with the two-corner member 24, and a third straight section 30 connects two four-corner members 28.

FIGURE 2 shows an enlarged view of one of the two-corner member 24 and FIGURE 3 of one of the four-corner member 28.

The method of fabrication of these corner members according to the invention will now be described in detail.

The critical portion of the corner members 24 and 28 is the intersection point of the cutting edges in the crotch formed by two corners. This intersection of the cutting edges at 32 (see FIGURES 2 and 3) must be absolutely sharp to obtain cleanly cut paper labels. As earlier pointed out, the minimum radius to which a steel rule can be bent by conventional bending methods is approximately twice the thickness of the steel rule. FIGURE 7 shows the rounded tip or corner 34 of a steel rule bent by conventional method. According to the invention this bent rule is inserted in a suitable press. A longitudinal force or pressure 36 is applied to each leg 38 of the V-shaped rule as shown in FIGURE 7 while the legs are guided and held in place by reactionary forces 67 produced by a wedge shaped follower 40, forcing the legs 38 against the sides of V-shaped die 42. As a suitable pressure, such as about 1300 lbs. for a 2 point rule, is applied to the legs 38 in a longitudinal direction the tip 34 is deformed and forced into the crotch of the V-shaped die 42 until the cutting edges 44 form a sharp intersection point 46 as shown in FIG. 8. This intersection point preferably is brought close to the outer periphery of the tip 34 as shown in FIGURE 9 by controlling the force or pressure 36 applied longitudinally to the legs 38 of the bent steel rule.

In FIGURE 5 a press is shown of simple construction which can be used to produce the sharply defined intersection of the cutting edges of a V-shaped steel rule cutter as disclosed herein. This press has a base 48 upon which rest the two jaws of the V-shaped die 42 by means of a hinge 50 fastened to each underside of the jaws of die 42 by screws 51 riding in slots (not shown) provided in the hinge in conventional manner. This enables the operator to alter the angle of the V-shaped die to suit the desired angle of the bent steel rule cutter, which angle preferably lies between 10 and 90 degrees. Further adjustment is made by the turning of nuts 52 bearing against a solid base 54 to increase or decrease the free length of stud 56. Other means well known in the art may be used to open the angle of the V-shaped die 42 to as much as 90 degrees.

After the steel rule cutter bent by conventional means has been placed into the die 42 with the wedge-shaped male die 40 placed against it as shown in the enlarged view of FIGURE 7, a threaded pusher 58 is placed on each side into matching grooves 59 provided in opposing sides of male die 40 and the jaws of die 42. Pusher 58 as shown in greater detail in FIGURE 6 has a piece of steel blade 60 inserted in a slot provided in its end. Blade 60 has a thickness equal to or slightly less than the thickness of the steel rule 10. When pusher 60 is inserted in the grooves 59 and is backed up by nuts 62 against a fixed base 64, pressure is applied to the legs 38 in longitudinal direction to force these legs into the crotch of die 42 to deform the tip 34 until the cutting edges 44 form a sharp intersection at 46. At the same time wedge shaped male die 40 follows the movement of pushers 60 by the application of a force 66 through stud 68 and nut 70 against fixed support 64 to guide legs 38 and hold them against the sides of die 42. Contrary to conventional methods practiced in the art wedge 40 is not used to push the bent steel rule down into the crotch, but merely acts as a follower of forces 36 producing reactionary forces 67 to prevent the buckling of legs 38 as shown in FIGURES 7 and 8.

In the press depicted in FIGURE 5 mechanical means such as studs 56, 58 and 68 and nuts 52, 62 and 70 have been used in exerting direct or reactionary pressures upon the conventionally pre-bent steel rule corner cutter 38. However these forces obviously could also be produced by other conventional means such as, for example, by pneumatic or hydraulic means.

FIGURES 10 and 11, and FIGURES 12 and 13 show two other embodiments of the invention wherein by means of lateral forces 70 the conventionally bent steel rule die 38 as shown in FIGURES 10 and 12 is deformed until the cutting edges 44 form a sharply defined intersection point 46. In FIGURES 10 and 11 pushing members 72 are confined and guided between an upper surface 74 and a lower surface 75 in sliding contact therewith. In FIGURES 12 and 13 the pushing members 76 exerting a lateral force 70 are hinged at 77 and when in operation describe an arc 78 in the process of forming a sharply defined tip 46 of cutting edges 44 as illustrated in FIGURE 13. As shown, the ends of the legs of the conventionally bent steel rule 38, which is inverted over the male die 79 having the desired angularity, are supported on a base 80. This base supports the reactionary longitudinal force which is a resultant of force 70 and which will deform the rounded tip 34 in the same manner as earlier herein described in connection with the preferred embodiment illustratively shown in FIGURES 7 and 8.

FIGURES 14 to 21 in addition to FIGURES 1 and 3 depict various examples of how the herein disclosed steel rule cutter tip can be made use of in forming many designs popular in the art of contour cutting. These can be combinations of straight pieces as shown in FIGURES 14 to 17, or curvilinear forms as illustrated in FIGURES 2 and 3, and FIGURES 18 to 21. In producing these shapes the angular steel rule corners as formed by the herein disclosed method are fitted against each other, or against a straight steel rule piece respectively, at the intersection point 46, see FIGURES 2 and 3, of the cutting edges 44. A spot weld 82, see FIGURE 22, placed at the portion of the steel rule that is removed from the cutting edge 44 joins the pieces permanently before the steel rule die 10 is inserted in the slot of the plywood board 12 as shown in FIGURES 1 and 6.

From the above it will be realized that our method of producing a corner cutting steel rule die having sharply intersecting cutting edges yields numerous advantages among which are the following:

(1) A substantial reduction in cost over one piece joiners or heads produced by machining and grinding;

(2) A reduction in cost of fabrication and maintenance over mitred or butted joints or heads; and (3) A considerable increase in structural strength due to one piece construction at the point of highest stress in comparison with mitred or butted joints.

While several specific embodiments of the invention have been shown and described, it will be apparent to those skilled in the art that various changes, modifications, substitutions, additions and omissions may be made there-

We claim:
1. A method for producing a steel die for cutting material, said die having a pair of cutting edges converging at an angle of at most 90° and meeting at a sharply defined angle tip, the improvement comprising the steps of:
 (a) bending a strip of steel rule normal to the longer sides thereof, with at least one of said longer sides being provided with a cutting edge, to form an angle defined by a pair of converging legs the cutting edges of said legs joining at a normally rounded angle tip; and
 (b) creating opposing lateral forces at either side of each leg to deform the normally rounded angle tip joining said edges and to produce a sharply defined interesection point of said cutting edges.

2. The method as defined in claim 1, wherein said opposing forces are reactionary forces guiding each leg along an angular path toward an imaginary intersection point of said legs, and wherein said reactionary forces are produced by the application of a force to each leg in longitudinal direction to move said legs toward said intersection point.

3. The method as defined in claim 2, wherein said longitudinal forces are of a magnitude which will stress the metal of said rule beyond its elastic limit causing flowing of a portion of said normally rounded tip to produce a sharp interesection point of said cutting edges.

4. A steel rule cutter produced by the method defined in claim 2 having two legs forming an angle and meeting at a tip, said tip including material which has been displaced toward the intersection point of the cutting edges of said legs.

5. A steel rule cutter having at least one long border thereof shaped into a cutting edge and having two legs forming an angle, with the cutting edge of each leg meeting at a tip, the improvement comprising:
 said tip including metal which has been displaced towards the apex of said angle to produce a sharp point of intersection of the cutting edges of said legs.

towards the apex of said angle to produce a sharp point of intersection is located within the outer half of the thickness of the steel rule tip.

7. The cuter as defined in claim 5, wherein the sharp point of the intersection coincides with the outer periphery of the steel rule tip.

References Cited

UNITED STATES PATENTS 3,205,732   9/1965   Hutcheon et al. _____ 76—107
3,263,547   8/1966   Pfaff et al. _____ 83—620

BERNARD STICKNEY, Primary Examiner

U.S. Cl. X.R.

72—375, 389, 414; 83—620